(12) United States Patent
Shin et al.

(10) Patent No.: US 10,349,121 B2
(45) Date of Patent: Jul. 9, 2019

(54) BROADCAST RECEIVING APPARATUS AND INFORMATION PROVIDING METHOD THEREOF

(71) Applicant: SAMSUNG ELECTRONICS CO., LTD., Suwon-si (KR)

(72) Inventors: Seung-min Shin, Seoul (KR); Seung-won Kim, Seoul (KR); Je-youn Dong, Suwon-si (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/268,898

(22) Filed: Sep. 19, 2016

(65) Prior Publication Data

US 2017/0085943 A1 Mar. 23, 2017

(30) Foreign Application Priority Data

Sep. 23, 2015 (KR) .................. 10-2015-0134389

(51) Int. Cl.
*H04N 21/438* (2011.01)
*H04N 21/482* (2011.01)
*H04N 21/472* (2011.01)
*H04N 21/426* (2011.01)
(Continued)

(52) U.S. Cl.
CPC ..... *H04N 21/4383* (2013.01); *H04N 21/4263* (2013.01); *H04N 21/472* (2013.01); *H04N 21/4821* (2013.01); *H04N 21/4882* (2013.01); *H04N 21/8456* (2013.01)

(58) Field of Classification Search
CPC .......... H04N 21/4383; H04N 21/4263; H04N 21/472; H04N 21/4821; H04N 21/4882
See application file for complete search history.

(56) References Cited

U.S. PATENT DOCUMENTS 5,786,845 A * 7/1998 Tsuria ................ H04N 5/44513
 348/E5.102
7,237,251 B1 * 6/2007 Oz ....................... H04N 5/4401
 348/E5.006

(Continued)

FOREIGN PATENT DOCUMENTS

JP 2014-120910 A 6/2014
KR 10-2008-0108819 A 12/2008
(Continued)

OTHER PUBLICATIONS

Search Report dated Dec. 28, 2016 issued by the International Searching Authority in counterpart International Application No. PCT/KR2016/010452 (PCT/ISA/210).
(Continued)

*Primary Examiner* — Alexander Q Huerta
(74) *Attorney, Agent, or Firm* — Sughrue Mion, PLLC

(57) ABSTRACT

An information providing method of a broadcast receiving apparatus is provided. The information providing method includes setting a channel zapping section including a plurality of zapping channels, acquiring information regarding the channel zapping section, and displaying information regarding the channel zapping section during a zapping time while channel zapping between the plurality of zapping channels is performed.

20 Claims, 6 Drawing Sheets

(a)

(b)

(c)

(51) Int. Cl.
*H04N 21/488* (2011.01)
*H04N 21/845* (2011.01)

(56) References Cited

U.S. PATENT DOCUMENTS

| | | | |
|---|---|---|---|
| 8,640,166 B1 * | 1/2014 | Craner | H04N 21/4826 725/37 |
| 9,100,691 B2 | 8/2015 | Seo | |
| 2002/0056098 A1 * | 5/2002 | White | H04N 5/44 725/39 |
| 2004/0172651 A1 * | 9/2004 | Wasilewski | H04N 5/44543 725/46 |
| 2005/0235318 A1 * | 10/2005 | Grauch | G06Q 30/02 725/46 |
| 2006/0101488 A1 * | 5/2006 | Cho | H04N 5/4401 725/39 |
| 2006/0123443 A1 * | 6/2006 | Hamilton | H04N 5/4401 725/32 |
| 2007/0006263 A1 * | 1/2007 | Uno | G11B 27/034 725/42 |
| 2008/0216124 A1 * | 9/2008 | Dekkers | H04N 5/45 725/59 |
| 2008/0307457 A1 | 12/2008 | Yang et al. | |
| 2009/0158328 A1 * | 6/2009 | Huysegems | H04N 7/17318 725/38 |
| 2010/0037267 A1 * | 2/2010 | Bennett | H04N 7/165 725/56 |
| 2010/0199308 A1 * | 8/2010 | Hall | H04N 5/44543 725/40 |
| 2010/0329328 A1 | 12/2010 | Kontola et al. | |
| 2010/0333125 A1 * | 12/2010 | Eldering | H04N 21/2353 725/14 |
| 2011/0145862 A1 | 6/2011 | Kim | |
| 2011/0173667 A1 * | 7/2011 | Watson | H04N 5/4401 725/56 |
| 2012/0060190 A1 * | 3/2012 | Lee | H04N 5/44543 725/46 |
| 2012/0257120 A1 | 10/2012 | Nakai | |
| 2012/0266188 A1 * | 10/2012 | Ryu | H04N 21/42204 725/25 |
| 2013/0014156 A1 * | 1/2013 | Seo | H04N 21/236 725/32 |
| 2013/0276005 A1 * | 10/2013 | Kim | G06Q 30/0241 725/8 |
| 2014/0165109 A1 * | 6/2014 | Stahulak | H04N 5/44543 725/56 |
| 2014/0201802 A1 * | 7/2014 | Boss | H04N 21/4263 725/134 |
| 2015/0128183 A1 | 5/2015 | Hyeon et al. | |
| 2015/0304706 A1 * | 10/2015 | Mun | H04N 21/4384 725/39 |

FOREIGN PATENT DOCUMENTS

| | | |
|---|---|---|
| KR | 10-2013-0004982 A | 1/2013 |
| KR | 10-2013-0026142 A | 3/2013 |
| KR | 10-1241893 B1 | 3/2013 |
| KR | 10-1280806 B1 | 7/2013 |
| KR | 10-2013-0136798 A | 12/2013 |

OTHER PUBLICATIONS

Written Opinion dated Dec. 28, 2016 issued by the International Searching Authority in counterpart International Application No. PCT/KR2016/010452 (PCT/ISA/237).

* cited by examiner

BROADCAST RECEIVING APPARATUS AND INFORMATION PROVIDING METHOD THEREOF

CROSS-REFERENCE TO RELATED APPLICATION

This application claims priority from Korean Patent Application No. 10-2015-0134389, filed in the Korean Intellectual Property Office on Sep. 23, 2015, the entire disclosure of which is incorporated herein by reference.

BACKGROUND

1. Field

Aspects of the exemplary embodiments relate to a broadcast receiving apparatus and an information providing method thereof, and more particularly, to a broadcast receiving apparatus which provides information during channel zapping and an information providing method thereof.

2. Description of Related Art

With the development of electronic technologies, various types of electronic products have been developed and distributed. In particular, various broadcast receiving apparatuses, such as TV, mobile phone, desktop PC, notebook PC, Large Format Display (LFD), PDA, set-top box, etc., have been widely used in general households, and the number of available broadcast channels for providing contents to such broadcast receiving apparatuses has also increased.

Under such circumstances, it is not easy for a user to search for and find a desired channel when using a broadcast receiving apparatus. Accordingly, a UI for informing broadcast program channels using Electronic Program Guide (EPG) information, etc., is provided. However, the user generally changes channels using a channel up/down key, etc., checks the contents of the channels, and then selects a channel, rather than using the UI for which the user has to learn the manipulation method.

In this case, the user's changing channels to select a desired channel is referred to as channel zapping, and a delay time which is generated between channels while changing channels is referred to as a zapping time. Because there are so many channels for a user to go through, considering the zapping time, it takes a lot of time for the user to select a desired channel.

Consequently, the user generally does not select a channel after zapping all available channels, and instead checks the contents of channels at a specific section through channel zapping and selects a channel, thereby generating a channel zapping section.

Accordingly, a technology for providing useful information to a user by using the user's behavioral pattern when using a broadcast receiving apparatus and a zapping time is required.

SUMMARY

Methods and apparatuses consistent with exemplary embodiments relate to setting a channel zapping section and providing useful information to a user during a zapping time of the corresponding section and an information providing method thereof.

According to an aspect of an exemplary embodiment, there is provided an information providing method of a broadcast receiving apparatus, including: setting a channel zapping section including a plurality of zapping channels; acquiring information regarding the channel zapping section; and displaying information regarding the channel zapping section during a zapping time while channel zapping between the plurality of zapping channels is performed.

The setting may further include: receiving a channel switch command; determining whether a channel tune time before a channel is being switched from a first channel to a second channel according to the channel switch command is greater than a predetermined critical time; and in response to the channel tune time being less than the predetermined critical time, registering the first channel as a zapping channel included in the channel zapping section.

The setting may further include: setting the channel zapping section differently according to at least one among a time slot and a day when the channel switch command is received, and a signal source input to the broadcast receiving apparatus.

The information regarding the channel zapping section may include at least one among first information which is acquired based on channel switching according to the channel switch command and second information which is acquired regardless of the channel switching.

The acquiring information regarding the channel zapping section may include updating the first information based on the channel switch command.

The displaying may include dividing the information regarding the channel zapping section by a number of the plurality of zapping channels included in the channel zapping section and displaying the information.

The displaying may include, in response to at least one of the plurality of zapping channels included in the channel zapping section being zapped, displaying brief information regarding each of the at least one zapped channel.

A number of the plurality of zapping channels in the channel zapping section may be more than one, and the displaying may include changing and displaying the second information based on the channel switch command.

The broadcast receiving apparatus may include a first tuner for receiving a broadcast signal regarding a currently selected channel and a second tuner for acquiring information regarding the channel zapping section.

According to an aspect of another exemplary embodiment, there is provided a broadcast receiving apparatus, including: an input interface configured to receive a command; a display; and a processor configured to set a channel zapping section including a plurality of zapping channels, acquire information regarding the channel zapping section, and control the display to display the information regarding the channel zapping section during a zapping time while channel zapping between the plurality of zapping channels is performed.

The processor may be further configured to, in response to a channel switch command being input through the input interface, determine whether a channel tune time before a channel is being switched from a first channel to a second channel according to the channel switch command is greater than a predetermined critical time, and in response to the channel tune time being less than the predetermined critical time, register the first channel as a zapping channel included in the channel zapping section.

The processor may be configured to set the channel zapping section differently according to at least one among a time slot and a day when the channel switch command is received, and a signal source input to the broadcast receiving apparatus.

The information regarding the channel zapping section may include at least one among first information which is acquired based on channel switching according to the channel switch command and second information which is acquired regardless of the channel switching.

The processor may be further configured to update the first information based on the command.

The processor may be configured to control the display to divide the information regarding the channel zapping section by a number of the plurality of zapping channels included in the channel zapping section and display the information.

The processor may be further configured to, in response to at least one of the plurality of zapping channels included in the channel zapping section being zapped, control the display to display brief information regarding each of the at least one zapped channel.

A number of the plurality of zapping channels in the channel zapping section may be more than one, and the processor may be further configured to control the display to change and display the second information based on the user command.

The may further include a first tuner for receiving a broadcast signal regarding a currently selected channel; and a second tuner for acquiring information regarding the channel zapping section.

BRIEF DESCRIPTION OF THE DRAWINGS

The above and/or other aspects will be more apparent by describing exemplary embodiments with reference to the accompanying drawings, in which.

DETAILED DESCRIPTION

In describing the present disclosure, well-known technologies are not described in detail because they would obscure the application with unnecessary detail.

Figure 1:
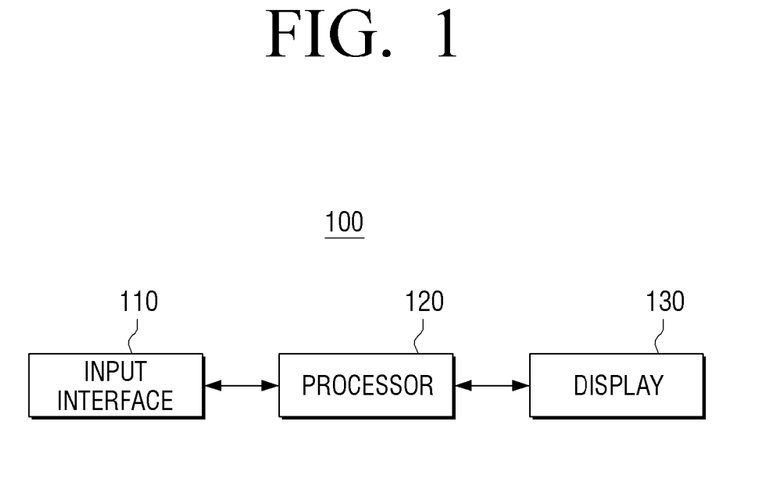
FIG. 1 is a block diagram illustrating configuration of a broadcast receiving apparatus according to an exemplary embodiment.

Hereinafter, various exemplary embodiments will be described in greater detail with reference to the accompanying drawings. FIG. 1 is a block diagram illustrating configuration of a broadcast receiving apparatus according to an exemplary embodiment. Referring to FIG. 1, a broadcast receiving apparatus 100 includes an input interface 110, a processor 120 and a display 130. In this case, the broadcast receiving apparatus 100 may be implemented as various types of electronic apparatuses such as TV, set-top box, electronic blackboard, electronic table, Large Format Display (LFD), smart phone, tablet PC, desktop PC, notebook PC, monitor, etc.

The input interface 110 receives a user command to manipulate the broadcast receiving apparatus 100. In particular, the input interface 110 may receive a channel switch command from a user.

To do so, the input interface 110 may be configured to include a button, a touch panel of the broadcast receiving apparatus 100 (when the display 130 is implemented as a touch screen), a remote signal receiver (when the broadcast receiving apparatus 100 is controlled through an external remote controller), etc.

The display 130 displays image data under the control of the processor 120. In particular, the display 130 may display information regarding a channel zapping section during a zapping time which is generated while channel zapping is performed under the control of the processor 120.

In this case, the information regarding a channel zapping section may include at least one of first information which is acquired by channel switching according to a channel switch command and second information which is acquired regardless of channel switching. Specifically, the first information refers to information which is acquired from a signal of a switched channel when a channel is switched, for example, snap shot information of the corresponding channel, EPG information of the corresponding channel, whether there is an advertisement time, etc., but is not limited thereto. The information regarding channels which have been zapped so far is also acquired through channel switching and thus, may be included in the first information. The second information refers to information which can be acquired from an external server, etc., regardless of channel switching, for example, current ratings information, information regarding cast of a broadcast program, real-time news, weather information, etc., but is not limited thereto.

To do so, the display 130 may be implemented as various types of displays, such as Liquid Crystal Display (LCD), Organic Light Emitting Diodes (OLED), Plasma Display Panel (PDP), etc., and may also include a touch screen.

The processor 120 controls the overall operations of the broadcast receiving apparatus 100. In particular, the processor 120 may set a channel zapping section including a plurality of zapping channels, acquire information regarding the channel zapping section, and control the display 130 to display the information regarding the channel zapping section during a zapping time which is generated while channel zapping between the plurality of zapping channels is performed.

Specifically, the processor 120 may set a channel zapping section. When a channel switch command is input through the input interface 100, the processor 120 may determine whether a time for maintaining the previous channel before the channel is switched according to the channel switch command is greater than a predetermined critical time.

If the maintenance time is less than the predetermined critical time, the processor 120 may register the previous channel before it is switched as a zapping channel included in a channel zapping section, and set a channel zapping section including the registered zapping channel.

For example, if the critical time is 10 minutes and a user switches 4 channels before the user selects a channel which is maintained more than 10 minutes, the processor 120 may register the 4 channels as zapping channels included in a channel zapping section, and set a channel zapping section including the 4 channels.

The processor 120 may acquire information regarding the channel zapping section which has been set above. Specifically, the processor 120 may acquire information regarding the channel zapping section by acquiring information regarding a plurality of channels included in the channel zapping section. In this case, as described above, the information regarding a plurality of channels may include first information which can be acquired only when a channel is switched to a corresponding channel and second information which can be acquired even if a channel is not switched to a corresponding channel.

Accordingly, when a plurality of channels included in the channel zapping section are zapped, the processor 120 may receive a broadcast signal of a channel which is being zapped and acquire the first information. In this case, the processor 120 may acquire the first information whenever each zapping channel included in the channel zapping section is zapped and update the first information. In addition, the processor 120 may acquire the second information from an external server, etc., regardless of channel zapping.

As such, while a channel zapping section is set and information regarding the set channel zapping section is acquired, if a command to switch a channel to a zapping channel included in the set channel zapping section is input through the input interface 110, the processor 120 may control the display 130 to display information regarding the corresponding channel zapping section during a zapping time which is generated while channel zapping between a plurality of zapping channels is performed.

In this case, the information regarding the channel zapping section which is displayed on the display 130 may be generated or processed by the processor 130 using the acquired information regarding the channel zapping section.

For example, the processor 120 may control the display to divide the information regarding the channel zapping section by the number of a plurality of zapping channels included in the channel zapping section and display the information. For example, if the channel zapping section includes 4 zapping channels, the processor 120 may control the display 130 to divide the second information such as a news article regarding the corresponding channel zapping section into 3 parts and display the information during each zapping time between zapping channels. As such, by dividing and displaying information, a considerable amount of information or information, including properties of continuity, may be displayed appropriately.

If all of the plurality of zapping channels included in the channel zapping section are zapped at least once, the processor 120 may control the display to display brief information regarding each of the plurality of zapping channels. Specifically, the processor 120 may acquire the first information regarding a switched channel whenever channels are switched according to a channel switch command and thus, when all of the channels included in the channel zapping section is zapped at least once, the first information regarding all zapping channels included in the corresponding channel zapping section may be acquired. Accordingly, the processor 120 may control the display 130 to display brief information regarding each zapping channel during a zapping time to make it easier for a user to select channels.

However, the example of displaying brief information regarding a zapping channel is not limited to the above case. In other words, in order to provide brief information regarding a zapping channel, it is not necessary for all zapping channels included in the corresponding channel zapping section to be zapped. If at least one of the plurality of zapping channels included in the channel zapping section is zapped, the first information regarding the zapped channel may be acquired and thus, brief information regarding the zapped channel may be provided.

Accordingly, if one of a plurality of zapping channels included in the channel zapping section is zapped, only brief information regarding the zapped channel may be displayed during a zapping time and subsequently, as more and more channels are zapped, brief information regarding those zapping channels may be displayed during a zapping time.

In addition, as described below, if a broadcast receiver 140 includes more than two tuners, a broadcast signal regarding the channel which is currently selected by a user may be received using one tuner and the first information regarding another zapping channel included in the channel zapping section may be received using the other tuner. Accordingly, even if the user does not zap all zapping channels included in the channel zapping section at once, brief information regarding all zapping channels may be displayed from the beginning.

In addition, there may be more than one channel zapping section and thus, the processor 120 may control the display 130 to change the second information at every channel zapping section and display the information. The second information is information which is acquired regardless of channel switching and has low relevance to the channel which is changed according to a user's channel switch command. Thus, if the second information is changed too frequently, the user may be distracted, and if the second information is rarely changed, the user may be bored. Accordingly, by changing the second information at every channel zapping section in accordance with the user's zapping behavior, the user may be less sensitive to the change of information.

Meanwhile, in the above exemplary embodiment, the broadcast receiving apparatus 100 includes the display 130, but this is only an example. In other words, the technical feature of the present disclosure may be applied to a set-top box which does not include the display 130.

In this case, the processor 120 of the set-top box may set a channel zapping section, acquire information regarding the channel zapping section, and generate information regarding the channel zapping section to be displayed during a zapping time, and transmit the information to an external display apparatus.

Figure 2:
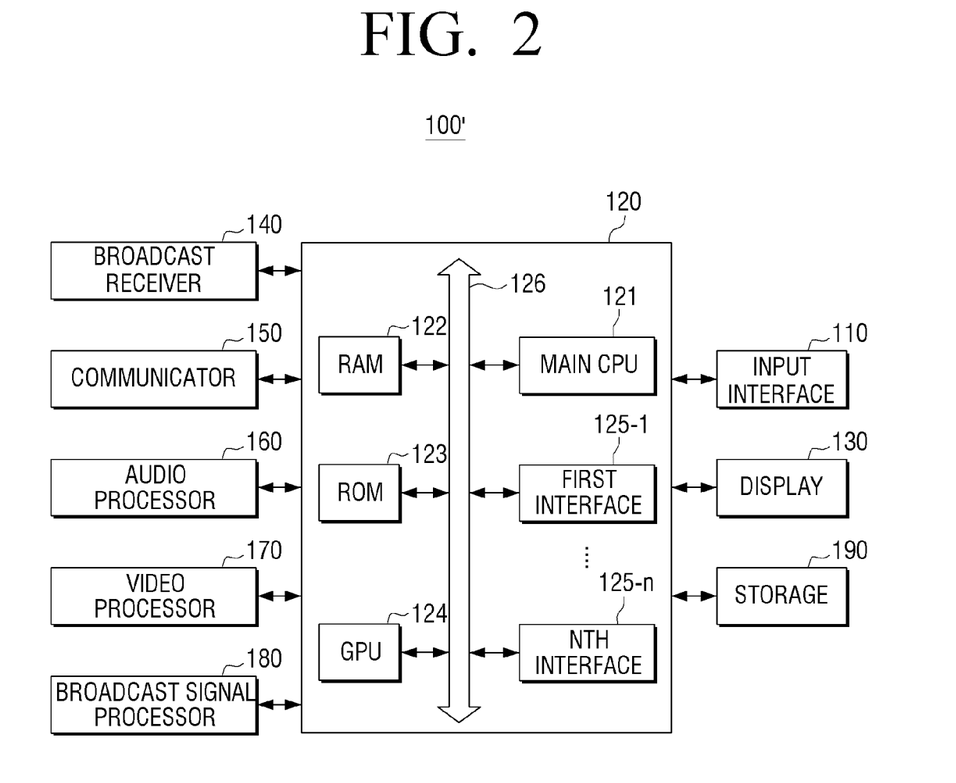
FIG. 2 is a block diagram illustrating configuration of a broadcast receiving apparatus in detail according to another exemplary embodiment.

Hereinafter, the operation of a broadcast receiving apparatus will be described in greater detail with reference to FIGS. 2 to 4. With respect to FIG. 2, the description which is overlapped with the description regarding FIG. 1 will not be provided. Referring to FIG. 2, a broadcast receiving apparatus 100' may include the input interface 110, the processor 120, the display 130, a broadcast receiver 140, a communicator 150, an audio processor 160, a video processor 170, a broadcast signal processor 180, and a storage 190.

The input interface 110 receives a user command to manipulate the broadcast receiving apparatus 100. The history of the user manipulation commands which are input through the input interface 110 may be stored in the storage 190. In this case, the history of user's manipulating the broadcast receiving apparatus 100' may be stored in the storage 190 according to time slot, day, or date, and information regarding the source which is connected to the broadcast receiving apparatus 100' at a time when a user command is input may also be matched and stored. However, this is only an example.

The broadcast receiver 140 receives a broadcast signal corresponding to a channel which is selected by a user from a broadcasting station. In particular, the broadcast receiver 140 may change a channel according to a user's channel switch command through the input interface 110 and receive a broadcast signal of the changed channel. To do so, the broadcast receiver 140 includes a tuner, and may be configured to include antenna, various wired or wireless Internet connection means, coaxial cable, etc., according to the type of the broadcast receiving apparatus.

Meanwhile, according to an exemplary embodiment, the broadcast receiver 140 may further include a first tuner for receiving a broadcast signal regarding a channel which is currently selected by the user and a second tuner for acquiring information regarding a channel zapping section.

As such, the broadcast receiver 140 may select a channel according to a user command and receive a broadcast signal corresponding to the selected channel. In this case, the received broadcast signal includes broadcast contents corresponding to the selected channel and additional information regarding the selected channel and thus, the processor 120 may acquire and process first information regarding the corresponding channel using the received broadcast signal and display the information on the display 130, which will be described later.

The communicator 150 performs communication with an external apparatus according to various types of communication methods. In particular, the communicator 150 may be connected to an external server via network such as Internet and transceive various information. For example, the communicator 150 may be connected to various servers which provide information regarding broadcast, and acquire second information such as ratings information, cast information of a broadcast program, articles or photos related to a broadcast program, real-time news, weather information, etc.

To do so, the communicator 150 may include at least one communication module out of a near-field wireless communication module and a wireless LAN communication module. Here, the near-field wireless communication module is a communication module which performs data communication with a nearby external apparatus wirelessly, and may include, for example, a Bluetooth module, a ZigBee module, an NFC module, etc. In addition, the wireless LAN communication module is a module which is connected to an external network according to a wireless communication protocol such as WiFi, IEEE, etc., to perform communication. The communicator 150 may further include a mobile communication module which is connected to a mobile communication network according to various mobile communication standards such as 3rd Generation (3G), 3rd Generation Partnership Project (3GPP), Long Term Evolution (LTE), etc., and perform communication. In addition, the communicator 150 may include at least one of wired communication modules such as High-Definition Multimedia Interface (HDMI), Universal Serial Bus (USB), Institute of Electrical and Electronics Engineers (IEEE) 1394, RS-232, etc.

As such, the broadcast receiving apparatus 100 may acquire the second information through the communicator 150 and accordingly, the processor 120 may acquire and process the second information and display the information on the display 130, which will be described later.

The broadcast signal processor 180 processes a broadcast signal which is received through the broadcast receiver 140 and divides the broadcast signal into a video signal, an audio signal and an additional signal. The divided video signal and audio signal are provided to the video processor 170 and the audio processor 160, respectively, for processing, and additional data is processed in the processor 120 and may be displayed on the display 130 as information related to a channel zapping section.

The video processor 170 processes a video signal provided by the broadcast signal processor 180. In other words, the video processor 170 may perform various processing with respect to image data included in a video signal, such as decoding, scaling, noise filtering, frame rate conversion, resolution conversion, etc. The processed image data may be displayed on the display 130.

The audio processor 160 processes an audio signal provided by the broadcast signal processor 180. In other words, the audio processor 160 may perform various processing with respect to audio data included in an audio signal, such as decoding, amplification, noise filtering, etc. The processed audio data may be output through a speaker.

The storage 190 may store various programs and data which are required to operate the broadcast receiving apparatus 100'. In addition, the storage 190 may perform the function of temporarily storing data which is generated or acquired during the operation of the broadcast receiving apparatus 100'.

In particular, the storage 190 may store information regarding a plurality of channel zapping sections which are set by the processor 120. In this case, the channel zapping section information may be divided and stored according to time slot, day, date, existence of holiday, information regarding a source device which provides contents to the broadcast receiving apparatus 100'.

In addition, the storage 190 may store information regarding a channel zapping section, information regarding a user's channel watching history, etc., which is acquired through the broadcast receiver 140 or the communicator 150, and according to an exemplary embodiment, the storage 190 may store a program for performing the functions of the processor 120 according to various exemplary embodiments in the form of at least one module.

To do so, the storage 190 may be implemented as various storage devices such as flash memory, hard disk, etc. According to an exemplary embodiment, a virtual device on a network may also be included in the scope of the storage 190.

The processor 120 controls the overall operations of the broadcast receiving apparatus 100'. For example, the processor 120 may control the overall operations of the electronic apparatus 100' using various modules stored in the storage 190. As illustrated in FIG. 2, the processor 120 includes a RAM 122, a ROM 123, a GPU 124, a main CPU 121, first to nth interfaces 125-1-125-n, and a bus 126. In this case, the RAM 122, the ROM 123, the GUI 124, the main CPU 121, the firth to the nth interfaces 125-1-125-n, etc., may be connected to each other through the bus 126.

The ROM 123 stores a set of commands for system booting. If a turn on command is input and thus power is supplied, the CPU 121 copies the O/S stored in the storage 190 to the RAM 122 and executes the O/S according to the command stored in the ROM 123, thereby booting the system. If the booting is completed, the CPU 121 copies various application programs stored in the storage 190 to the RAM 122 and executes the application programs copied to the RAM 122, thereby performing various operations. In particular, the main CPU 121 may perform various operations using various program modules, data, etc., stored in the storage 190.

When the booting of the electronic apparatus 100' is completed, the GPU 124 displays an image. Specifically, the GPU 124 may create a screen including various objects such as an icon, an image, a text, etc., using an operator and a renderer. Here, the operator may be a component for operating attribute values, such as coordinate values, forms, sizes, and colors by which each object is displayed according to a layout of the screen. The renderer may be a component for generating a screen of various layouts including an object based on the attribute values calculated by the operator. The screen created by the renderer may be provided to the display 130 and displayed on a display region.

The first to the nth interfaces 125-1 to 125-*n* are connected to the above-described various elements 110, 130 to 190. One of the interfaces may be a network interface which is connected to an external apparatus via network.

In particular, the processor 120 may set a channel zapping section. Such a channel zapping section is set since providing information regarding the channel zapping section is useful to a user since the user tends to select a channel by checking contents of channels through channel zapping in a specific section, thereby creating a channel zapping section including the certain number of zapping channels.

For example, a user generally 1) selects a channel after zapping broadcast channels of a specific category according to a channel organization structure (for example, terrestrial broadcasting, comprehensive programming broadcasting, sports broadcasting, drama broadcasting, etc.), 2) selects a channel which is easy to press (for example, channel 11) from the current channel and then, selects a channel after zapping several channels back and forth, 3) if preferred channels are registered, zaps the registered preferred channels and then selects a channel, or 4) selects and zaps channels of a specific genre which are filtered through using Electric Program Guide (EPG) information and then selects a channel.

Accordingly, based on the above-described user's behavior of channel zapping, a channel zapping section may be set. Specifically, if a channel switch command is input through the input interface 100, the processor 120 may determine whether the time for maintaining the previous channel before a channel is switched according to the channel switch command is more than a predetermined critical time, and if the maintenance time is less than the predetermined critical time, register the previous channel before being switched as a zapping channel included in a channel zapping section and set the channel zapping section.

In this case, the processor 120 may set a channel zapping section separately according to a user's a viewing environment of the broadcast receiving apparatus 100. For example, the processor 120 may set a channel zapping section separately according to the time slot, day, date when a channel switch command is input or the source (for example, Internet, separate set-top box, antenna, etc.) of a signal which is input to the broadcast receiving apparatus 100. In this case, a channel zapping section may vary depending on whether it is in the morning or afternoon, whether it is weekday or weekend, and it may also vary according to an apparatus which is connected to the broadcast receiving apparatus 100. As such, because a channel zapping section is further subdivided and set, when a user performs channel zapping in the channel zapping section later, more suitable information may be provided to the user.

Meanwhile, the processor 120 may acquire information regarding a channel zapping section which is set as described above. Here, the information regarding a channel zapping section may include first information which is acquired according to channel switching and second information which is acquired regardless of channel switching, and the processor 120 may acquire the first information regarding a corresponding channel through a broadcast signal which is received through the broadcast receiver 140 and the second information which has nothing to do with channel switching from an external server through the communicator 150 or by reading information stored in the storage 190.

In other words, the first information is information which is acquired in real time through a user's channel zapping behavior (or a channel switching behavior) and may include, for example, snap-shot information related to the corresponding channel, EPG information included in a broadcast signal of the current channel, whether there is an advertisement time, information on channels which have been zapped so far, etc. The second information is fixed external information which has nothing to do with the user's channel zapping behavior and may include, for example, current ratings information, information regarding cast of a broadcast program, real-time news, weather information, viewing history information, etc.

Meanwhile, according to an exemplary embodiment, the broadcast receiver 140 may include a first tuner for receiving a broadcast signal regarding the channel which is currently selected by a user and a second tuner for acquiring information regarding a channel zapping section. In this case, even before there is a channel change through the first tuner according to a user's channel switch command, the processor 120 may acquire information regarding the set channel zapping section through the second tuner and thus, the processor 120 may acquire or update the first information in real time. Accordingly, the first information from among information regarding the channel zapping section may be provided on more real time basis.

As such, if a channel switch command is input through the input interface 110 while a channel zapping section is set and information regarding the set channel zapping section is acquired, the processor 120 may control the display 130 to display information regarding the channel zapping section during a zapping time which is generated while channel zapping between a plurality of zapping channels included in the channel zapping section is performed.

Specifically, the processor 120 may identify a zapping time which is generated according to a channel switch command. For example, the processor 120 may identify a zapping time by sensing a channel up/down button manipulation signal or by sensing the time where a pause screen is generated or a black screen is displayed during channel changing. However, this is only example, and the method for identifying a zapping time is not limited to the above.

Accordingly, when a zapping time is identified, the processor 120 may determine whether the identified zapping time is included in the channel zapping section. For example, the processor 120 may determine whether the corresponding zapping time is a zapping time which is included in between zapping channels. If so, the processor 120 may determine that the corresponding zapping time is a zapping time included in the channel zapping section. However, the method of determining whether the identified zapping time is included in the channel zapping section is not limited to the above.

Accordingly, if it is determined that the identified zapping time is included in the channel zapping section, the processor 120 may control the display 130 to display information regarding the channel zapping section where the identified zapping time is included.

In this case, the display 130 may display the information regarding the channel zapping section during the zapping time in various ways under the control of the processor 120, which will be described in detail with reference to FIGS. 3 and 4.

Figure 3:
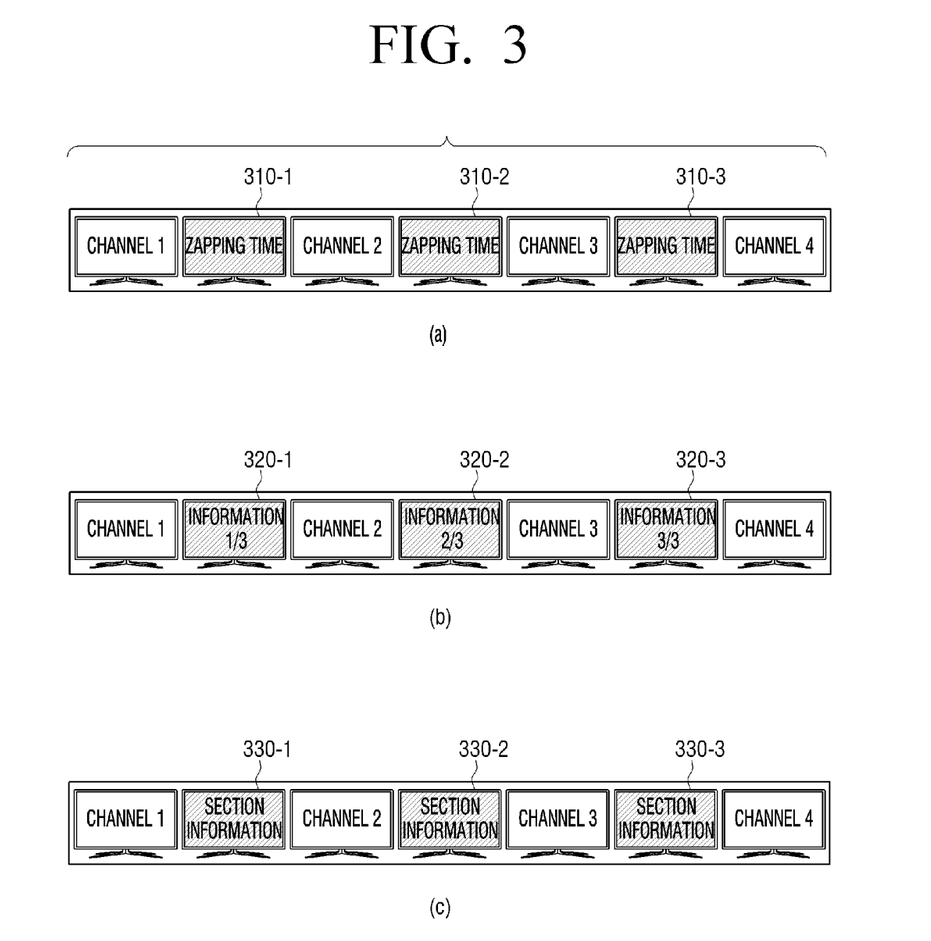
FIGS. 3 and 4 are exemplary views of a broadcast receiving apparatus displaying information related to a channel zapping section.
Figure 4:
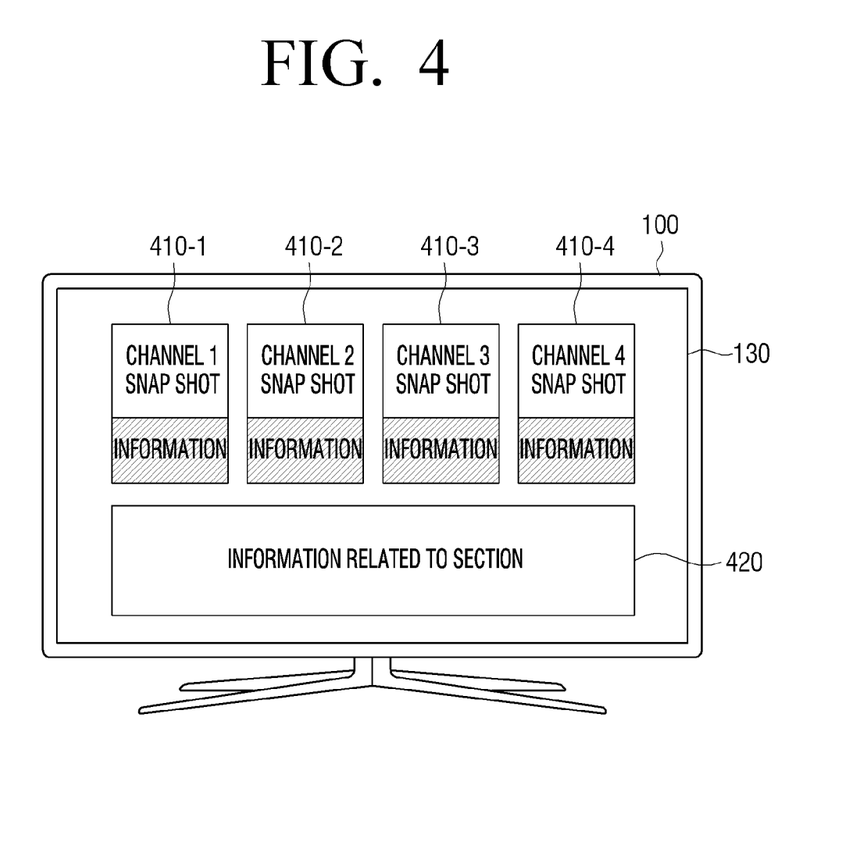

FIGS. 3 and 4 are exemplary views where a broadcast receiving apparatus displays information related to a channel zapping section. Specifically, FIG. 3 illustrates a channel zapping section including channels 1 to 4. In this case, as illustrated in (a), zapping times 310-1 to 310-3 exist between zapping channels.

According to an exemplary embodiment, the processor 120 may control the display 130 to divide information regarding the channel zapping section according to the number of a plurality of zapping channels included in the channel zapping section and control the display 130 to display the divided information. In other words, as illustrated in (b), the processor 120 may divide the information regarding the channel zapping section into three parts and control the display 130 to display one third of the information during each zapping time 320-1 to 320-3. In this case, the information displayed during each zapping time 320-1 to 320-3 may be the second information regarding the corresponding channel zapping section being divided into three parts (for example, if the channels included in the channel zapping section are sports channels, a sports-related article or photo), but is not limited thereto.

Meanwhile, according to another exemplary embodiment, as illustrated in (c), the processor 120 may control the display 130 to display the information regarding the channel zapping section during each zapping time 330-1 to 330-3 in a consistent manner.

In this case, the information regarding the channel zapping section which is displayed in a consistent manner may be the second information, and according to an exemplary embodiment, if the channel zapping section is changed, that is, if a user zaps channels in another channel zapping section, the processor 120 may control the display 130 to change the displayed second information to the second information related to the changed channel zapping section and display the changed second information. In other words, the processor 120 may control the display 130 to change and display the second information at every channel zapping section.

Meanwhile, according to another exemplary embodiment, if all of a plurality of zapping channels included in the channel zapping section are zapped at least once, the processor 120 may control the display 130 to display brief information regarding each of the plurality of zapping channels. FIG. 4 illustrates an example of brief information displayed on the display 130. In other words, the first information 410-1 to 410-4 including snap-shot information regarding each of the zapping channels (channel 1 to channel 4) included in the channel zapping section and the second information 420 related to the corresponding channel zapping section may be summarized and displayed on one screen.

In other words, if all zapping channels included in the channel zapping section are zapped at least once, it is highly likely that a user could select a next desired channel, and if all zapping channels are zapped once, as described above, the first information related to the corresponding zapping channel section (for example, snap-shot information, broadcast title information, etc.) may be acquired for all zapping channels and thus, the processor 120 may help the user select a channel by providing brief information such as FIG. 4 so that the user may check information regarding each channel included in the channel zapping section.

In particular, if there are a plurality of zapping channels, a user may have difficulty in remembering the contents of the channels which the user has zapped previously and thus, providing such brief information may be useful to the user.

In this case, the processor 120 according to an exemplary embodiment may process the brief information in the form of a channel selection page to allow the user to select a channel quickly without a zapping time.

Meanwhile, if the broadcast receiver 140 includes the second tuner for acquiring information related to the channel zapping section according to the above-described exemplary embodiment, the first information regarding a desired channel may be acquired any time through the second tuner and thus, it is not required that a plurality of zapping channels included in the channel zapping section are zapped at least once as described above in order to provide brief information.

Hereinafter, an exemplary embodiment where the broadcast receiver 140 includes the second tuner will be described. For example, if three channel zapping sections, that is, a general zapping section including six zapping channels, a movie channel zapping section including four zapping channels and a sports channel zapping section including five zapping channels are set as each channel zapping section, a user may start channel zapping using a channel up button while watching general channel A.

In this case, the user is expected to zap movie channels, the processor 120 may control the broadcast receiver 140 to acquire real-time information regarding movie channels, that is, the first information using the second tuner. Subsequently, when zapping of the movie channel zapping section is started after zapping of the general channel zapping section is finished, the processor 120 may control the display 130 to display information related to the movie channel zapping section during a zapping time. In this case, the first information such as snap-shot information regarding each zapping channel, movie title information, information regarding movie running time, etc., and the second information such as news articles and photos regarding the corresponding movie, etc., may be displayed during the zapping time.

Meanwhile, as the user is expected to zap a sports channel zapping section afterwards, the processor 120 may control the broadcast receiver 140 to acquire the first information of the sports channel zapping section using the second tuner while the user is zapping movie channels. Accordingly, if zapping of the sports channel zapping section is started, the processor 120 may control the display 130 to display information regarding the sports channel zapping section during each zapping time. In this case, the first information such as snap-shot information regarding each zapping channel, game title information, information regarding game running time, etc., and the second information such as news articles and photos regarding the recent sports games may be displayed during each zapping time.

Meanwhile, according to another exemplary embodiment, the processor 120 may select the second information related to the corresponding channel zapping section by analyzing the characteristics of each of a plurality of channel zapping sections. Specifically, the processor 120 may determine the types of channels included in the channel zapping section and analyze the characteristics of the corresponding channel zapping section. However, the method of analyzing the characteristics of the channel zapping section is not limited to the above. Accordingly, the processor 120 may select the second information related to the corresponding channel zapping section from various pieces of the second information acquired from an external server.

For example, if the channel included in the channel zapping section is a sports channel, the processor 120 may determine the corresponding channel zapping section as a sports channel zapping section in various methods. Accordingly, the processor 120 may select the second information such as the latest sports news articles, etc., from among the second information acquired through the communicator 150 and control the display 120 to display the selected second information during a zapping time. However, this is only an example, and if the user zaps a preferred channel list, the processor 120 may control the display 130 to summarize and display the viewing history information as the second information.

Meanwhile, if a zapping channel included in the channel zapping section is zapped while information regarding the set channel zapping section is not acquired, the processor 120 may control the display 130 to display a black-out (a black screen).

Figure 5:
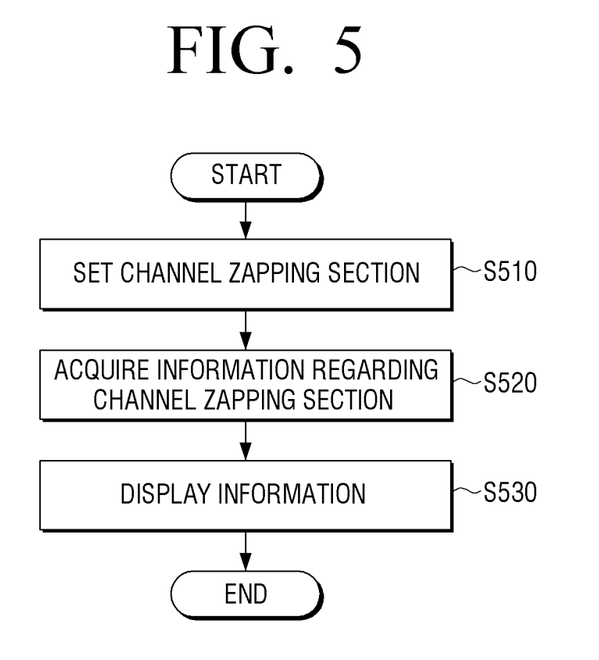
FIG. 5 is a flowchart illustrating an information providing method of a broadcast receiving apparatus according to an exemplary embodiment.

FIG. 5 is a flowchart illustrating an information providing method of a broadcast receiving apparatus according to an exemplary embodiment. Referring to FIG. 5, broadcast receiving apparatuses 100, 100' may set a channel zapping section including a plurality of zapping channels (S510).

Figure 6:
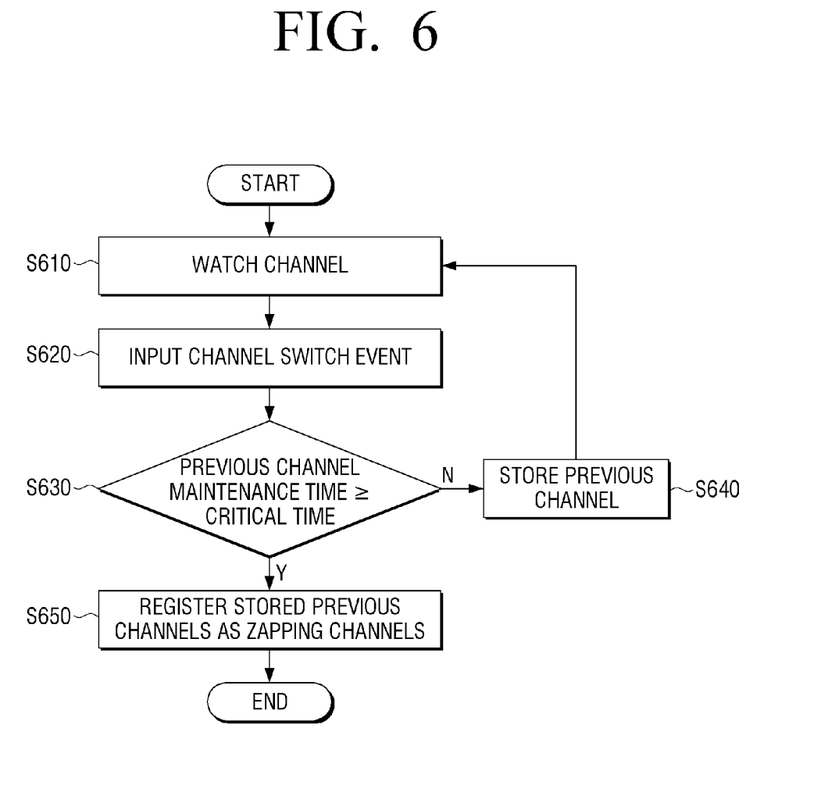
FIG. 6 is a flowchart of a broadcast receiving apparatus setting a channel zapping section according to an exemplary embodiment.

In this case, the broadcast receiving apparatuses 100, 100' may set a channel zapping section using the method illustrated in FIG. 6. Referring to FIG. 6, if a user starts watching a channel (S610) and then, a channel switch event such as the user's channel switch command is input (S620), the broadcast receiving apparatuses 100, 100' may determine whether the time for maintaining the previous channel before the channel is switched according to the input channel switch command is more than a predetermined critical time (S630).

If it is determined that the channel maintenance time is less than the predetermined critical time (S630, N), the broadcast receiving apparatuses 100, 100' stores the previous channel (S640). If the channel maintenance time is more than the predetermined critical time (S630, Y), the broadcast receiving apparatus 100, 100' may register the stored previous channels as zapping channels included in the channel zapping section (S650) and set a channel zapping section including the registered zapping channels.

In this case, according to an exemplary embodiment, the broadcast receiving apparatuses 100, 100' may set a channel zapping section separately according to at least one of the time slot and day when a channel switch command is input and a source of a signal input to the broadcast receiving apparatuses 100, 100'.

Referring back to FIG. 5, the broadcast receiving apparatuses 100, 100' may acquire information regarding the set channel zapping section (S520). In this case, the information regarding the channel zapping section may include at least one of the first information which is acquired according to channel switching and the second information which is acquired regardless of the channel switching. Accordingly, according to an exemplary embodiment, the broadcast receiving apparatuses 100, 100' may update the first information whenever each zapping channel included in the channel zapping section is zapped.

In addition, according to an exemplary embodiment, the broadcast receiving apparatuses 100, 100' includes the first tuner for receiving a broadcast signal regarding the channel which is currently selected by a user and the second tuner for acquiring information regarding the channel zapping section, and may acquire the first information through the second tuner.

As such, if a channel zapping section is set and information regarding the channel zapping section is acquired, the broadcast receiving apparatuses 100, 100' may display information regarding the channel zapping section during a zapping time which is generated while channel zapping between a plurality of zapping channels included in the channel zapping section is performed (S530).

Specifically, the broadcast receiving apparatuses 100, 100' may divide the information regarding the channel zapping section by the number of a plurality of zapping channels included in the channel zapping section and display the divided information. In addition, if all of the plurality of zapping channels included in the channel zapping section are zapped at least once, the broadcast receiving apparatuses 100, 100' may display brief information regarding each of the plurality of zapping channels. Further, if there are a plurality of channel zapping sections, the broadcast receiving apparatuses 100, 100' may change and display the second information at every channel zapping section.

According to the above-described various exemplary embodiments, a channel zapping section may be set as a user uses the broadcast receiving apparatus, and information regarding the set channel zapping section may be provided during a zapping time of the corresponding channel zapping section. Accordingly, the user may select a desired channel more easily and be provided with useful information.

Meanwhile, the operation of the processor 120 of the broadcast receiving apparatus 100 or the methods of proving information of the broadcast receiving apparatus according to the above-described various exemplary embodiments may be generated as software and mounted on the broadcast receiving apparatus 100.

For example, a non-transitory computer readable medium storing a program which performs the information providing method may be installed. The information providing method may include setting a channel zapping section including a plurality of zapping channels, acquiring information regarding the channel zapping section and displaying information regarding the channel zapping section during a zapping time which is generated while channel zapping between a plurality of zapping channels is performed.

The non-transitory recordable medium refers to a medium which may store data semi-permanently rather than storing data for a short time, such as register, cache, memory, etc., and is readable by an apparatus. Specifically, the above-described various applications and programs may be stored and provided in a non-transitory recordable medium such as CD, DVD, hard disk, Blu-ray disk, USB, memory card, ROM, etc.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An information providing method of a broadcast receiving apparatus, comprising:
identifying a first channel based on a tune time of the first channel exceeding a predetermined critical time;
identifying a plurality of zapping channels tuned for less than the predetermined critical time before the first channel;
identifying a channel zapping section including the plurality of zapping channels tuned before the first channel for less than the predetermined critical time;
obtaining information regarding each of the plurality of zapping channels of the channel zapping section; and
displaying the information regarding each of the plurality of zapping channels of the channel zapping section during a zapping time while channel zapping between the plurality of zapping channels is performed.

2. The information providing method as claimed in claim 1, further comprising receiving a channel switch command; and switching a current channel of the broadcast receiving apparatus in response to receiving the channel switch command.

3. The information providing method as claimed in claim 2, further comprising identifying the channel zapping section based on at least one among a time slot and a day when the channel switch command is received, and a signal source input to the broadcast receiving apparatus.

4. The information providing method as claimed in claim 2, wherein the information regarding the channel zapping section includes at least one among first information which is obtained based on channel switching according to the channel switch command and second information which is obtained regardless of the channel switching.

5. The information providing method as claimed in claim 4, wherein the obtaining information regarding the channel zapping section comprises updating the first information based on the channel switch command.

6. The information providing method as claimed in claim 4, wherein a number of the plurality of zapping channels in the channel zapping section is more than one, and wherein the displaying comprises changing and displaying the second information based on the channel switch command.

7. The information providing method as claimed in claim 1, wherein the displaying comprises dividing the information regarding the channel zapping section by a number of the plurality of zapping channels included in the channel zapping section and displaying the information.

8. The information providing method as claimed in claim 1, wherein the displaying comprises, based on at least one of the plurality of zapping channels included in the channel zapping section being zapped, displaying brief information regarding each of the plurality of zapping channels of the channel zapping section.

9. The information providing method as claimed in claim 1, wherein the broadcast receiving apparatus comprises a first tuner for receiving a broadcast signal regarding a currently selected channel and a second tuner for obtaining information regarding the channel zapping section.

10. A broadcast receiving apparatus, comprising:
an input interface; and
a processor configured to:
identify a first channel based on a tune time of the first channel exceeding a predetermined critical time,
identify a plurality of zapping channels tuned for less than the predetermined critical time before the first channel,
identify a channel zapping section including the plurality of zapping channels tuned before the first channel for less than the predetermined critical time,
obtain information regarding each of the plurality of zapping channels of the channel zapping section, and
control the information regarding each of the plurality of zapping channels of the channel zapping section to be displayed during a zapping time while channel zapping between the plurality of zapping channels is performed.

11. The broadcast receiving apparatus as claimed in claim 10, wherein the processor is further configured to switch a current channel of the broadcast receiving apparatus in response to a channel switch command being input through the input interface.

12. The broadcast receiving apparatus as claimed in claim 11, wherein the processor is further configured to identify the channel zapping section based on at least one among a time slot and a day when the channel switch command is received, and a signal source input to the broadcast receiving apparatus.

13. The broadcast receiving apparatus as claimed in claim 11, wherein the information regarding the channel zapping section includes at least one among first information which is obtained based on channel switching according to the channel switch command and second information which is obtained regardless of the channel switching.

14. The broadcast receiving apparatus as claimed in claim 13, wherein the processor is further configured to update the first information based on the channel switch command.

15. The broadcast receiving apparatus as claimed in claim 13, wherein a number of the plurality of zapping channels in the channel zapping section is more than one, and wherein the processor is further configured to change and display the second information based on the channel switch command.

16. The broadcast receiving apparatus as claimed in claim 10, further comprising a display;

wherein the processor is further configured to control the display to divide the information regarding the channel zapping section by a number of the plurality of zapping channels included in the channel zapping section and display the information.

17. The broadcast receiving apparatus as claimed in claim 10, wherein the processor is further configured to, based on at least one of the plurality of zapping channels included in the channel zapping section being zapped, display brief information regarding each of the plurality of zapping channels of the channel zapping section.

18. The broadcast receiving apparatus as claimed in claim 10, further comprising:
a first tuner for receiving a broadcast signal regarding a currently selected channel; and
a second tuner for obtaining information regarding the channel zapping section.

19. The broadcast receiving apparatus as claimed in claim 10, wherein the information regarding each of the plurality of zapping channels comprises at least one from among snap-shot information related to each of the plurality of zapping channels, electronic program guide information related to each of the plurality of zapping channels, and information regarding whether there is an advertisement on each of the plurality of zapping channels.

20. A non-transitory computer-readable medium storing a program which, when executed by a processor of an electronic device, causes the processor to control the electronic device to perform operations comprising:
identifying a first channel based on a tune time of the first channel exceeding a predetermined critical time;
identifying a plurality of zapping channels tuned for less than the predetermined critical time before the first channel;
identifying a channel zapping section including the plurality of zapping channels tuned before the first channel for less than the predetermined critical time;
obtaining information regarding each of the plurality of zapping channels of the channel zapping section; and
displaying the information regarding each of the plurality of zapping channels of the channel zapping section during a zapping time while channel zapping between the plurality of zapping channels is performed.

\* \* \* \* \*